US009992456B2

(12) United States Patent
Luo et al.

(10) Patent No.: US 9,992,456 B2
(45) Date of Patent: Jun. 5, 2018

(54) METHOD AND APPARATUS FOR HYPOTHETICAL REFERENCE DECODER CONFORMANCE ERROR DETECTION

(75) Inventors: Jiancong Luo, West Windsor, NJ (US);
Richard Edwin Goedeken, Santa Clarita, CA (US); Joan Llach, Cesson-Sevigne Cedex (FR)

(73) Assignee: THOMSON LICENSING DTV, Issy les Moulineaux (FR)

( * ) Notice: Subject to any disclaimer, the term of this patent is extended or adjusted under 35 U.S.C. 154(b) by 833 days.

(21) Appl. No.: 12/932,055

(22) Filed: Feb. 16, 2011

(65) Prior Publication Data

US 2011/0216836 A1    Sep. 8, 2011

Related U.S. Application Data

(60) Provisional application No. 61/307,680, filed on Feb. 24, 2010.

(51) Int. Cl.
| H04N 7/12 | (2006.01) |
| H04N 11/02 | (2006.01) |
| H04N 11/04 | (2006.01) |
| H04N 19/00 | (2014.01) |

(52) U.S. Cl.
CPC .................................. *H04N 7/26* (2013.01)

(58) Field of Classification Search
USPC .................................................... 375/240.25
See application file for complete search history.

(56) References Cited

U.S. PATENT DOCUMENTS

2006/0233236 A1* 10/2006 Labrozzi et al. ........ 375/240.03
2007/0002946 A1*  1/2007 Bouton et al. .......... 375/240.01

* cited by examiner

*Primary Examiner* — Hee-Yong Kim
(74) *Attorney, Agent, or Firm* — Brian J. Dorini; Patricia A. Verlangieri (57) ABSTRACT

A method and apparatus are disclosed and described for providing hypothetical reference decoder conformance error detection. The apparatus includes a multi-pass encoder (200) for encoding pictures in a video sequence. The pictures are encoded in a first pass to determine a bit consumption of each picture, and a bit allocation is controlled during the encoding of the pictures in at least a second pass responsive to satisfying requirements for a subsequent decoding of the bitstream. The requirements relate to preventing at least one of underflow and overflow conditions in a buffer during the subsequent decoding. The bit allocation is based on the bit consumption determined in the first pass and buffer parameters. The pictures are encoded in at least the first and second passes into a plurality of bitstreams on a scene-basis such that any of the pictures belonging to a same scene are respectively encoded in a same one of the bitstreams.

4 Claims, 3 Drawing Sheets

METHOD AND APPARATUS FOR HYPOTHETICAL REFERENCE DECODER CONFORMANCE ERROR DETECTION

CROSS-REFERENCE TO RELATED APPLICATIONS

This application claims the benefit of U.S. Provisional Application Ser. No. 61/307,680, filed Feb. 24, 2010, which is incorporated by reference herein in its entirety.

TECHNICAL FIELD

The present principles relate generally to video encoding and, more particularly, to a method and apparatus for hypothetical reference decoder conformance error correction.

BACKGROUND

Hypothetical reference decoder (HRD) conformance is typically a normative part of video compression standards. A hypothetical reference decoder generally presents a set of requirements on the bitstream. A hypothetical reference decoder verifier may include software and/or hardware and is typically used to verify conformance of a bitstream to the requirements by examining the bitstream, detecting whether any hypothetical reference decoder errors exist and, if so, reporting such errors.

In the context of video compression standards, such as the International Organization for Standardization/International Electrotechnical Commission (ISO/IEC) Moving Picture Experts Group-1 (MPEG-1) Standard, the ISO/IEC MPEG-2 Standard, the ISO/IEC MPEG-4 Standard, the International Telecommunication Union, Telecommunication Sector (ITU-T) H.261 Recommendation, the ITU-T H.263 Recommendation, and the ISO/IEC MPEG-4 Part 10 Advanced Video Coding (AVC) Standard/ITU-T H.264 Recommendation (hereinafter the "MPEG-4 AVC standard"), as well as extensions of the same (e.g., including the extensions of the MPEG-4 AVC Standard such as, for example, the multi-view video coding (MVC) extension and the scalable video coding (SVC) extension), a bitstream is determined to be conformant if the bitstream adheres to the syntactical and semantic rules embodied in the standard. One such set of rules takes the form of a successful flow of the bitstream through a mathematical or hypothetical model of the decoder, which is conceptually connected to the output of an encoder and receives the bitstream from the encoder. Such a model decoder is referred to a hypothetical reference decoder (HRD) in some standards or the video buffer verifier (VBV) in other standards. In other words, the hypothetical reference decoder specifies rules that bitstreams generated by a video encoder adhere to for such an encoder to be considered conformant under a given standard. HRD is typically a normative part of video coding standards and, hence, any bitstream under a given standard has to adhere to the HRD rules and constraints, and a real decoder can assume that such rules have been conformed with and such constraints have been met.

In a first prior art approach, we have previously disclosed and described a hypothetical reference decoder. The hypothetical reference decoder described with respect to the first prior art approach is capable of correcting certain types of hypothetical reference decoder errors in a concatenated bitstream. However, buffer underflow errors cannot be corrected without re-encoding. Therefore, if any buffer underflow error occurs, re-encoding is required, which may lead to other hypothetical reference decoder errors occurring in different places in the bitstream.

SUMMARY

These and other drawbacks and disadvantages of the prior art are addressed by the present principles, which are directed to a method and apparatus for hypothetical reference decoder conformance error correction.

According to an embodiment of the present principles, there is provided an apparatus. The apparatus includes a multi-pass encoder for encoding pictures in a video sequence. The pictures are encoded in a first pass to determine a bit consumption of each of the pictures, and a bit allocation is controlled during the encoding of the pictures in at least a second pass responsive to satisfying requirements for a subsequent decoding of the bitstream. The requirements relate to preventing at least one of an underflow condition and an overflow condition in a buffer during the subsequent decoding of the bitstream. The bit allocation is based on the bit consumption determined in the first pass and buffer parameters. The pictures are encoded in at least the first and the second pass into a plurality of resultant bitstreams on a scene-basis such that any of the pictures belonging to a same scene are respectively encoded in a same one of the plurality of resultant bitstreams.

According to another aspect of the present principles, there is provided a method in a multi-pass encoder. The method includes encoding pictures in a video sequence. The encoding step includes encoding the pictures in a first pass to determine a bit consumption of each of the pictures, and controlling a bit allocation during the encoding of the pictures in at least a second pass responsive to satisfying requirements for a subsequent decoding of the bitstream. The requirements relate to preventing at least one of an underflow condition and an overflow condition in a buffer during the subsequent decoding of the bitstream. The bit allocation is based on the bit consumption determined in the first pass and buffer parameters. The pictures are encoded in at least the first and the second pass into a plurality of resultant bitstreams on a scene-basis such that any of the pictures belonging to a same scene are respectively encoded in a same one of the plurality of resultant bitstreams.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for hypothetical reference decoder conformance error correction.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "initial removal delay" (IRD) refers to the time period (that must elapse) until the subsequent decoding of a first picture in a particular scene is commenced. In the case where a buffering period (defined below) is a scene, then the initial removal delay will not change for all pictures in that buffering period/scene. Hence, in such a case, the initial removal delay will be an initial removal delay of a particular scene.

The phrase "final arrival time to removal time delay" refers to the time period between the final arrival time and the removal time of a picture. The phrase "final arrival time" refers to the time that the final bit of a picture enters the decoder buffer. The phrase "removal time" refers to the time that a picture is removed from the decoder buffer and instantaneously decoded. Hence, the final arrival time and the removal time are different for each picture. Also, the final arrival time to removal time delay is also different for each picture. Regarding the preceding two phrases, namely the "initial removal delay" and the "final arrival time to removal time delay", we respectfully point out that the same may be referred to using the prefix word "estimated" and "actual", the former representing a calculated value and the latter representing an actual measured value. In an embodiment, except for the first picture of a scene, the actual final arrival time and removal time of a particular picture are calculated based on the previous picture's final arrival time and removal time and the actual bits of that particular picture. In an embodiment, the final arrival time to removal time delay of a particular scene refers to the final arrival time to removal time delay of the last picture of that particular scene. In an embodiment, for each scene, we compare the initial removal delay with the target value on the first picture, and we compare the final arrival time to removal time delay with the target value on the last picture.

The phrase "buffering period" refers to the set of access units between two instances of the buffering period SEI message in decoding order. In an embodiment, a buffering period refers to a scene.

The phrase "base scene" refers to the "original sequence".

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed.

Figure 1:
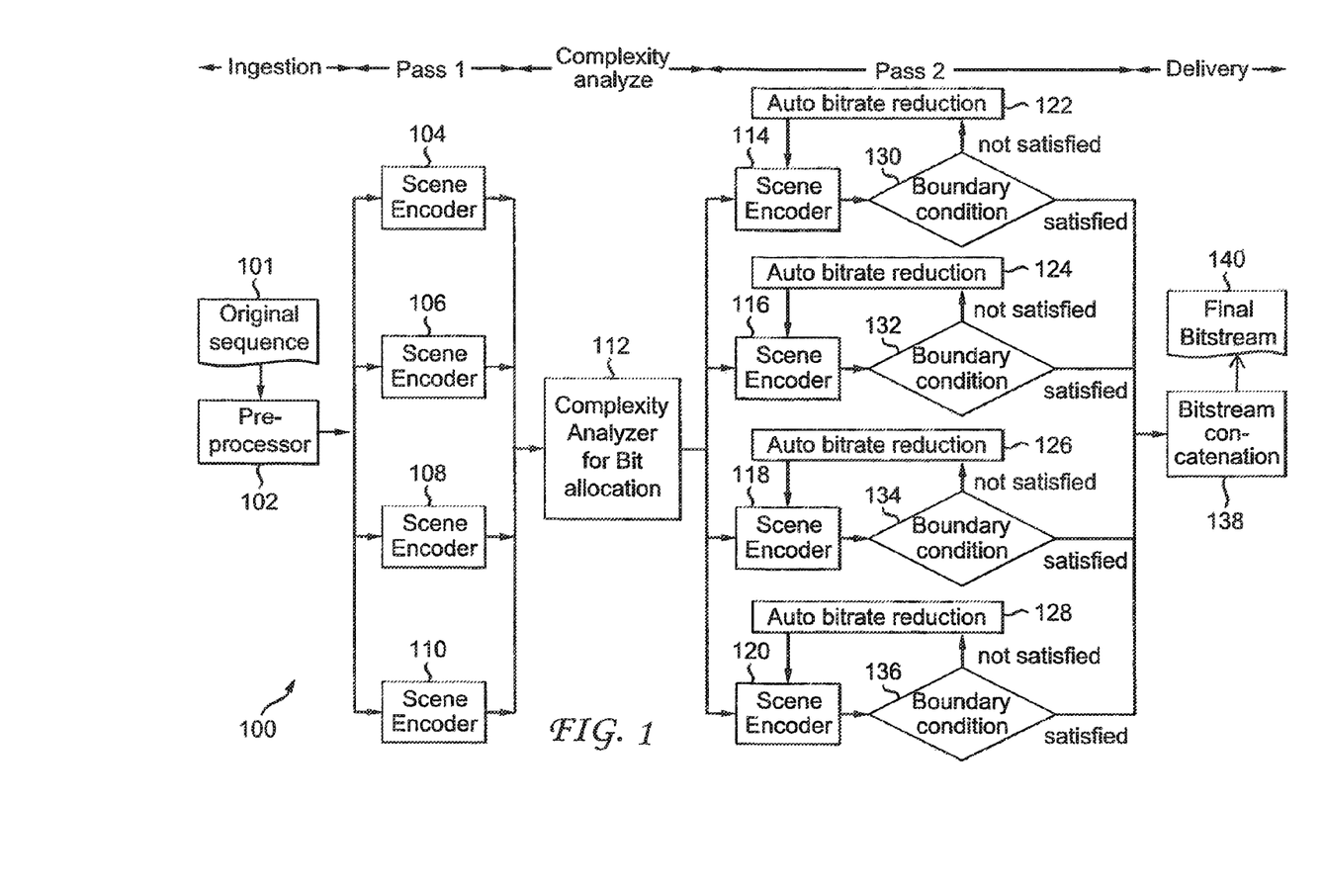
FIG. 1 is a block diagram showing an exemplary hypothetical reference decoder automatic enforced encoder system, in accordance with an embodiment of the present principles.

Turning to FIG. 1, an exemplary hypothetical reference decoder automatic enforced encoder system is indicated generally by the reference numeral 100. The hypothetical reference decoder automatic enforced encoder system 100 includes a pre-processor 102 having an output connected in signal communication with respective inputs of a scene encoder 104, a scene encoder 106, a scene encoder 108, and a scene encoder 110. Respective outputs of the scene encoders 104, 106, 108, and 110 are connected in signal communication with an input of a complexity analyzer for bit allocation 112. An output of the complexity analyzer 112 is connected in signal communication with respective first inputs of a scene encoder 114, a scene encoder 116, a scene encoder 118, and a scene encoder 120. An output of the scene encoder 114 is connected in signal communication with an input of a boundary condition determiner 130. An output of the scene encoder 116 is connected in signal communication with an input of a boundary condition determiner 132. An output of the scene encoder 118 is connected in signal communication with an input of a boundary condition determiner 134. An output of the scene encoder 120 is connected in signal communication with an input of a boundary condition determiner 136. A first output of the boundary condition determiner 130 is connected in signal communication with an input of an auto bitrate reducer 122. A first output of the boundary condition determiner 132 is connected in signal communication with an input of an auto bitrate reducer 124. A first output of the boundary condition determiner 134 is connected in signal communication with an input of an auto bitrate reducer 126. A first output of the boundary condition determiner 136 is connected in signal communication with an input of an auto bitrate reducer 128. An output of the auto bitrate reducer 122 is connected in signal communication with a second input of the scene encoder 114. An output of the auto bitrate reducer 124 is connected in signal communication with a second input of the scene encoder 116. An output of the auto bitrate reducer 126 is connected in signal communication with a second input of the scene encoder 118. An output of the auto bitrate reducer 128 is connected in signal communication with a second input of the scene encoder 120. Respective second outputs of the boundary condition determiner 130, the boundary condition determiner 132, the boundary condition determiner 134, and the boundary condition determiner 136 are connected in signal communication with an input of a bitstream concatenator 138. An output of the pre-processor 102 is available as an input to the hypothetical reference decoder automatic enforced encoder system 100, for receiving an original sequence 101. An output of the bitstream concatenator 138 is available as an output of the hypothetical reference decoder automatic enforced encoder system 100, for outputting a final bitstream 140.

Figure 2:
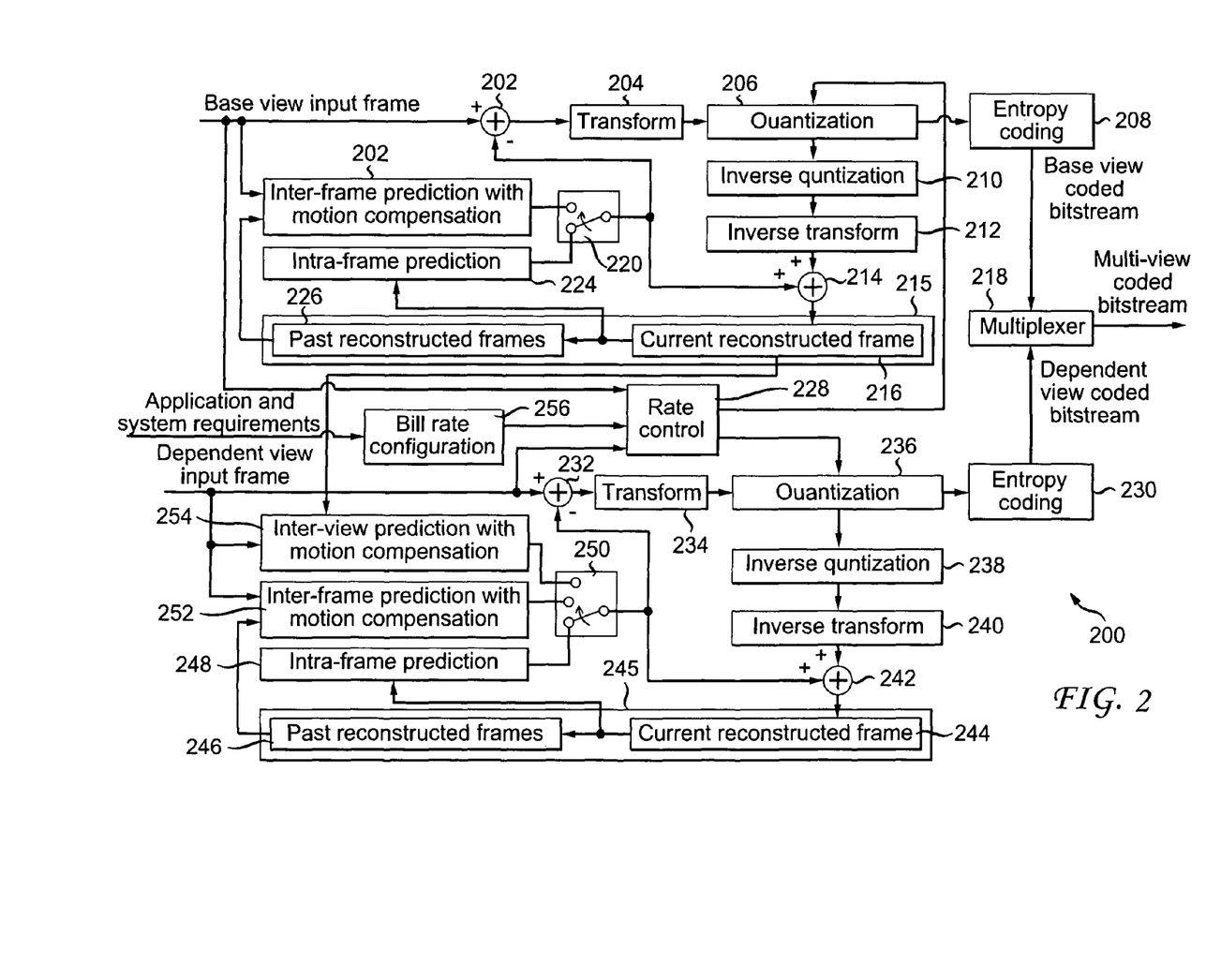
FIG. 2 is a block diagram showing an exemplary multi-view video encoder, in accordance with an embodiment of the present principles.

Turning to FIG. 2, an exemplary multi-view video encoder is indicated generally by the reference numeral 200. The video encoder 200 includes a combiner 202 having an output connected in signal communication with an input of a transformer 204. An output of the transformer 204 is connected in signal communication with a first input of a quantizer 206. A first output of the quantizer 206 is connected in signal communication with an input of an inverse quantizer 210. An output of the inverse quantizer 212 is connected in signal communication with an input of an inverse transformer 212. An output of the inverse transformer 212 is connected in signal communication with a first non-inverting input of a combiner 214. An output of the combiner 214 is connected in signal communication with an input of a buffer 215. The buffer 215 stores a current reconstructed frame 216 output from the combiner 214 as well as past reconstructed frames 226 previously output from the combiner 214. A first output of the buffer 215 is connected in signal communication with an input of an intra-frame predictor 224. A second output of the buffer 215 is connected in signal communication with a first input of an inter-frame predictor with motion compensation 222. An output of the intra-frame predictor 226 is connected in signal communication with a first input of a switch 220. An output of the inter-frame predictor with motion compensation 222 is connected in signal communication with a second input of the switch 220. An output of the switch 220 is connected in signal communication with an inverting input of the combiner 202 and a second non-inverting input of the combiner 214. A second output of the quantizer 206 is connected in signal communication with an input of an entropy coder 208. An output of the entropy coder 208 is connected in signal communication with a first input of a multiplexer 218.

An output of a bit rate configurer 256 is connected in signal communication with a first input of a rate controller 228. A first output of the bit rate configure 256 is connected in signal communication with a second input of the quantizer 206. A second output of the rate controller 228 is connected in signal communication with a first input of a quantizer 236. A first output of the quantizer 236 is connected in signal communication with an input of an entropy coder 230. An output of the entropy coder 230 is connected in signal communication with a second input of the multiplexer 218. A second output of the quantizer 236 is connected in signal communication with an input of an inverse quantizer 238. An output of the inverse quantizer 238 is connected in signal communication with an input of an inverse transformer 240. An output of the inverse transformer 240 is connected in signal communication with a first non-inverting input of a combiner 242. An output of the combiner 242 is connected in signal communication with an input of a buffer 245. A first output of the buffer 245 is connected in signal communication with an input of an intra-frame predictor 248. An output of the intra-frame predictor 248 is connected in signal communication with a first input of a switch 250. A second output of the buffer 245 is connected in signal communication with a first input of an inter-frame predictor with motion compensation 2152. An output of the inter-frame predictor with motion compensation 252 is connected in signal communication with a second input of the switch 250. A third output of the buffer 215 is connected in signal communication with a first input of an inter-view predictor with motion compensation 254. An output of the inter-view predictor with motion compensation 254 is connected in signal communication with a third input of the switch 250. An output of the switch 250 is connected in signal communication with an inverting input of a combiner 232 and a second non-inverting input of the combiner 242. An output of the combiner 232 is connected in signal communication with an input of a transformer 234. An output of the transformer 234 is connected in signal communication with an input of a quantizer 236.

A non-inverting input of the combiner 202, a second input of the inter-frame predictor with motion compensation 222, and a second input of the rate controller 228 are available as inputs of the MVC video encoder 200, for receiving a base view input frame. An input of the bit rate configure is available as an input of the MVC video encoder 200, for receiving application and system requirements. A third input of the rate controller 228, a non-inverting input of the combiner 232, a second input of the inter-view predictor with motion compensation 254, and a second input of the inter-view predictor with motion compensation 252 are available as inputs of the MVC encoder 200, for receiving a dependent view input frame. An output of the multiplexer 218 is available as an output of the MVC encoder 200, for outputting a multi-view coded bitstream.

As noted above, the present principles are directed to a method and apparatus for hypothetical reference decoder conformance error correction.

An embodiment of the TIGER video encoder system is shown and described with respect to FIG. 1. The TIGER video encoder system, which is capable of producing a bitstream compliant with the MPEG-4 AVC Standard, adopts a scene-based encoder structure, i.e., the whole video sequence to be encoded is divided into scenes. Each scene includes one or more consecutive pictures. The encoder system launches encoder objects to encode scenes separately. Then, the encoder system concatenates scene bitstreams into a final bitstream. The advantage of this structure is the support of parallel encoding, i.e., multiple encoder objects can be launched in parallel and multiple scenes can be encoded simultaneously. Such a structure also has advantages in supporting advanced features, such as scene detection, picture type decision, bit allocation, frame/field coding decision, re-encoding, and so forth. For instance, scene detection can detect a scene boundary when a cut, fade in or fade out occurs in the video. Decisions of coding parameters such as picture type, bit rate, field/frame coding mode, and so forth, can adapt to the video characteristics in the base scene. If a video segment needs to be adjusted, then only the affected scenes need to be re-encoded.

However, despite its advantages, scene parallel encoding is challenging for achieving the hypothetical reference decoder conformance.

HRD has a sequential nature, i.e., the buffer status of the current access unit (AU) depends on that of the preceding AU presented in the bitstream, and eventually depends on the initial buffer status with which the HRD is initialized. In a sequential encoder system, the hypothetical reference decoder conformance can be guaranteed if the bit rate is properly controlled. In a parallel encoder system, such as a scene-based parallel structure, it is difficult to guarantee the conformance of the final bitstream. This is because the initial buffer status of a scene to be encoded depends on the final buffer status of the previous scene, which is usually not available yet. In a sequential encoder system that supports scene re-encoding, although the initial buffer status of the re-encoded scene is known, the change in final buffer status of the scene will affect the buffer status of the following scenes due to the causality between access units. Buffer underflow errors may occur. The present principles are directed to the overcoming the aforementioned problem.

The hypothetical reference decoder corresponding to the MPEG-4 AVC Standard utilizes a leaky bucket model for virtual buffer modeling. The virtual buffer (also referred to as "coded picture buffer" or "CPB") is placed between the channel and the decoder. The leaky bucket model is characterized by three parameters: B, which denotes the buffer size; R, which denotes the bit rate at which the bits are entering the CPB; and F, which denotes the initial buffer fullness and, thus, specifies the initial buffer accumulation before decoding the first picture. F can also be equivalently expressed by an initial buffer delay, which denotes the waiting time period until the start of the decoding of the first picture.

In the MPEG-4 AVC Standard, instantaneous decoding refresh (IDR) access units or random access supplemental enhancement information (SEI) messages are inserted in the bitstream to facilitate random access. An instantaneous decoding refresh access unit or a random access supplemental enhancement information message starts a buffering period. Each buffering period has an initial removal delay (IRD). The initial removal delay is conveyed in a buffering period supplemental enhancement information message, which can be sent in-band or out-of-band. As used herein, in-band refers to sending an item (e.g., in the preceding case, the buffering period supplemental enhancement information message) together with or in a bitstream to which the item belongs. Out-of-band refers to sending the item separate from the bitstream.

For conforming bitstreams, the coded picture buffer shall not overflow or underflow. In addition, the following restriction applies to guarantee that random access to any access unit starting a buffering period will not change the relative timing in the hypothetical reference decoder.

Restriction

The initial removal delay of a buffering period has to be equal to (or smaller than if a constant bit rate is required) the distance between the final arrival time of the last access unit in the preceding buffering period, and the removal time of the first access unit in the current buffering period. Here, the final arrival time of an access unit is the time when the last bit of the access unit enters the coded picture buffer. The removal time of an access unit is the time when the access unit is removed from the coded picture buffer and decoded.

Due to this restriction, the IRD of a buffering period depends on the final arrival time of the proceeding buffer period. With the parallel encoding structure, the restriction is not always satisfied because the preceding buffering period may not be finished yet.

In accordance with the present principles, we propose a method and apparatus to enable a video encoder to efficiently produce hypothetical reference decoder conforming bitstreams.

An embodiment in a multi-pass encoder system includes the following steps.

Ingestion

The video sequence is prepared to be encoded in this step. The sequence is divided into scenes. The scene detection can be performed manually or automatically. In an embodiment, scene detection is performed using an intelligent algorithm.

Pass-1 Encoding

The pass-1 encoding is performed to collect the bit consumption of each frame. Each scene is encoded individually. A scene is started with an IDR, i.e., a new buffering period starts at the scene boundary.

Complexity Analysis and Bit Allocation

The video sequence is analyzed before pass-2 encoding. Bits are allocated to each frame based on the pass-1 encoding bit consumption and the hypothetical reference decoder parameters (B, F and R). The bit allocation is tested with HRD. If the bit allocation is not conforming, then re-allocation is required. The final bit allocation shall conform to HRD. Then, the following values are calculated for each scene i during the hypothetical reference decoder test:

$FATRD_i$ final arrival time to removal time delay $IRD_i$: initial removal delay $IRD_0$ is predetermined;

For i>0, $IRD_i = FATRD_{i-1} + tg_i$. $tg_i$ is the removal delay between the last access unit of scene i−1 and the first access unit of scene i.

Pass-2 Encoding

In pass-2 encoding, the picture type of each frame is aligned to that of the pass-1 encoding.

For each scene I, the following is performed:
a. Set the initial removal delay value to $IRD_i$ as calculated from the bit allocation step.
b. Set the target bit rate as calculated from the bit allocation step.
c. Encode scene i with the target bit rate.
d. Test scene bitstream with the hypothetical reference decoder with the initial removal delay value equal to $IRD_i$.
e. If coded picture buffer overflow or underflow is detected during the test, then go to step g.
f. Calculate the final arrival time to removal time delay of the last access unit in the test. If it is smaller than $FATRD_i$ as calculated from the bit allocation step, then go to step g. Otherwise, the scene bitstream is conforming and the encoding of scene i is finished.
g. Reduce the target bit rate of scene i by delta. Then go to step d.

Delivery

When the encodings of all the scenes are finished, the scene bitstreams are concatenated in order.

One novel aspect of the present principles is the following: the boundary thresholds ($IRD_i$ and $FATRD_i$) are defined such that when the boundary conditions (actual initial removal delay of scene i<=$IRD_i$ and actual final arrival time to removal time delay of scene i>=$FATRD_i$) are satisfied, the concatenation of scene bitstreams is HRD compliant, given the scene bitstreams are individually HRD compliant.

Figure 3:
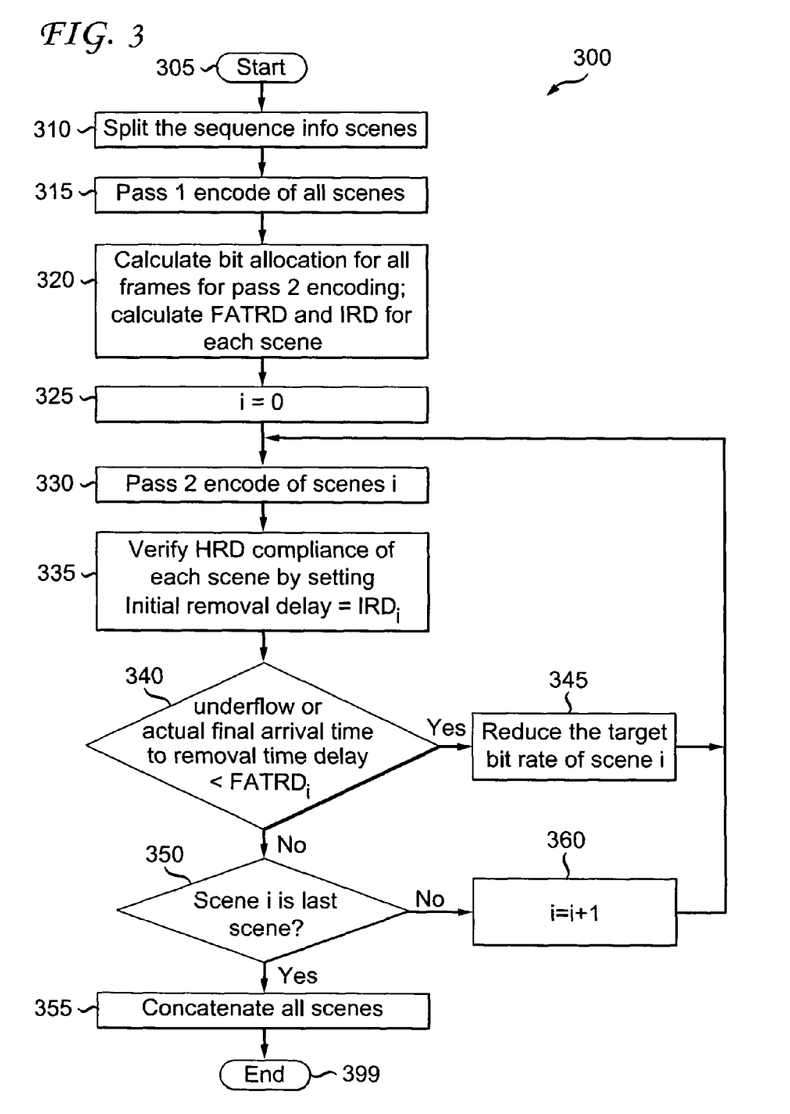
FIG. 3 is a flow diagram showing an exemplary method for hypothetical reference decoder conformance error correction, in accordance with an embodiment of the present principles.

Turning to FIG. 3, an exemplary method for hypothetical reference decoder conformance error correction is indicated generally by the reference numeral 300. The method 300 includes a start block 305 that passes control to a function block 310. The function block 310 splits the sequence into scenes, and passes control to a function block 315. The function block 315 performs a first pass (pass 1) to encode of all of the scenes, and passes control to a function block 320. The function block 320 calculates a bit allocation for all frames for a second pass (pass 2), by calculating FATRD and IRD for each scene, and passes control to a function block 325. The function block 325 sets a variable i equal to 0, and passes control to a function block 330. The function block 330 performs pass 2 of scene I, and passes control to a function block 335. The function block 335 verifies the hypothetical reference decoder (HRD) compliance of each scene by setting an initial removal delay equal to IRDi, and passes control to a decision block 340. The decision block 340 determines whether or not an underflow has occurred or the actual final arrival time to removal time delay <FATRDi. If so, then control is passed to a function block 345. Otherwise, control is passed to a decision block 350. The function block 345 reduces the target bit rate of scene i, and returns control to the function block 330. The decision block 350 determines whether or not scene i is the last scene. If so, then control is passed to a function block 355. Otherwise, control is passed to a function block 360. The function block 355 concatenates all scenes, and passes control to an end block 399. The function block 360 sets i=i+1, and returns control to the function block 330.

A description will now be given of some of the many attendant advantages/features of the present invention, some of which have been mentioned above. For example, one advantage/feature is an apparatus having a multi-pass encoder for encoding pictures in a video sequence. The pictures are encoded in a first pass to determine a bit consumption of each of the pictures. A bit allocation is controlled during the encoding of the pictures in at least a second pass responsive to satisfying requirements for a subsequent decoding of the bitstream. The requirements relate to preventing at least one of an underflow condition and an overflow condition in a buffer during the subsequent decoding of the bitstream. The bit allocation is based on the bit consumption determined in the first pass and buffer parameters. The pictures are encoded in at least the first and the second pass into a plurality of resultant bitstreams on a scene-basis such that any of the pictures belonging to a same scene are respectively encoded in a same one of the plurality of resultant bitstreams.

Another advantage/feature is the apparatus having the multi-pass encoder as described above, wherein the video sequence is divided into scenes and respective ones of the pictures belonging to the same one of the scenes are grouped together in a pre-encoding pass.

Yet another advantage/feature is the apparatus having the multi-pass encoder as described above, wherein the requirements pertain to at least one of a particular video coding standard and a particular video coding recommendation.

Still another advantage/feature is the apparatus having the multi-pass encoder as described above, wherein the encoder encodes the pictures into one or more resultant bitstreams in compliance with the International Organization for Standardization/International Electrotechnical Commission Moving Picture Experts Group-4 Part 10 Advanced Video Coding Standard/International Telecommunication Union, Telecommunication Sector H.264 Recommendation.

Still yet another advantage/feature is the apparatus having the multi-pass encoder as described above, wherein upon failing to meet the requirements, a re-allocation corresponding to the bit allocation is performed.

Moreover, another advantage/feature is the apparatus having the multi-pass encoder as described above, wherein the buffer parameters include at least one of a buffer size, a bitrate at which bits enter the buffer, and an initial buffer fullness determined prior to decoding any of the pictures in the sequence.

Further, another advantage/feature is the apparatus having the multi-pass encoder as described above, wherein each of the scenes corresponds to a respective one of a plurality of buffering periods applied to the buffer, and a compliance of a particular one of the plurality of bitstreams corresponding to a particular one of the scenes with the requirements is determined based on an estimated initial removal delay of a buffering period corresponding to the particular one of the scenes, the estimated initial removal delay denoting a time period until the subsequent decoding of a first one of the pictures in the particular one of the scenes is commenced, wherein the estimated initial removal delay is calculated based on at least the bit consumption determined in the first pass.

Also, another advantage/feature is the apparatus having the multi-pass encoder wherein each of the scenes corresponds to a respective one of a plurality of buffering periods applied to the buffer, and a compliance of a particular one of the plurality of bitstreams corresponding to a particular one of the scenes with the requirements is determined based on an estimated initial removal delay of a buffering period corresponding to the particular one of the scenes as described above, wherein the compliance with the requirements is further determined based on an estimated final arrival time to removal time delay, the estimated final arrival time to removal time delay denoting a time period between a final arrival time and a removal time of a particular one of the pictures in the video sequence, the final arrival time denoting a time that a final bit of the particular one of the pictures enters the decoded buffer, and the removal time denoting a time that the particular one of the pictures is removed from the decoded buffer and instantaneously decoded.

Additionally, another advantage/feature is the apparatus having the multi-pass encoder wherein the compliance with the requirements is further determined based on an estimated final arrival time to removal time delay as described above, wherein the particular one of the plurality of bitstreams corresponding to the particular one of the scenes is determined to be compliant with the requirements when an actual initial removal delay of the particular one of the scenes is less than or equal to the estimated initial removal delay of the particular one of the scenes and an actual arrival time to removal time delay of the particular one of the scenes is greater than or equal to the estimated final arrival time to removal time delay of the particular one of the scenes.

Moreover, another advantage/feature is the apparatus having the multi-pass encoder wherein each of the scenes corresponds to a respective one of a plurality of buffering periods applied to the buffer, and a compliance of a particular one of the plurality of bitstreams corresponding to a particular one of the scenes with the requirements is determined based on an estimated initial removal delay of a buffering period corresponding to the particular one of the scenes as described above, wherein each of the plurality of buffering periods respectively commences at a respective scene boundary for a corresponding one of the scenes.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
   a multi-pass encoder for encoding pictures in a video sequence, wherein the pictures are encoded in a first pass to determine a bit consumption of each of the pictures, and a bit allocation is controlled during the encoding of the pictures in at least a second pass responsive to satisfying requirements for a subsequent decoding of the bitstream, the requirements relating to preventing at least one of an underflow condition and an overflow condition in a buffer during the subsequent decoding of the bitstream, the bit allocation based on the bit consumption determined in the first pass and buffer parameters, the pictures being encoded in at least the first and the second pass into a plurality of resultant bitstreams on a scene-basis such that any of the pictures belonging to a same scene are respectively encoded in a same one of the plurality of resultant bitstreams,
   wherein each of the scenes corresponds to a respective one of a plurality of buffering periods applied to the buffer, and a compliance of a particular one of the plurality of bitstreams corresponding to a particular one of the scenes with the requirements is determined based on an estimated initial removal delay of a buffering period corresponding to the particular one of the scenes, the estimated initial removal delay denoting a time period until the subsequent decoding of a first one of the pictures in the particular one of the scenes is commenced,
   wherein the estimated initial removal delay is calculated based on at least the bit consumption determined in the first pass, and
   wherein the compliance with the requirements is further determined based on an estimated final arrival time to removal time delay, the estimated final arrival time to removal time delay denoting a time period between a final arrival time and a removal time of a particular one of the pictures in the video sequence, the final arrival time denoting a time that a final bit of the particular one of the pictures enters the decoded buffer, and the removal time denoting a time that the particular one of the pictures is removed from the decoded buffer and instantaneously decoded.

2. The apparatus of claim 1, wherein the particular one of the plurality of bitstreams corresponding to the particular one of the scenes is determined to be compliant with the requirements when an actual initial removal delay of the particular one of the scenes is less than or equal to the estimated initial removal delay of the particular one of the scenes and an actual arrival time to removal time delay of the particular one of the scenes is greater than or equal to the estimated final arrival time to removal time delay of the particular one of the scenes.

3. In a multi-pass encoder, a method, comprising:
encoding pictures in a video sequence,
wherein said encoding step comprises:
   encoding the pictures in a first pass to determine a bit consumption of each of the pictures; and
   controlling a bit allocation during the encoding of the pictures in at least a second pass responsive to satisfying requirements for a subsequent decoding of the bitstream,
wherein the requirements relate to preventing at least one of an underflow condition and an overflow condition in a buffer during the subsequent decoding of the bitstream, the bit allocation is based on the bit consumption determined in the first pass and buffer parameters, the pictures are encoded in at least the first and the second pass into a plurality of resultant bitstreams on a scene-basis such that any of the pictures belonging to a same scene are respectively encoded in a same one of the plurality of resultant bitstreams,
wherein each of the scenes corresponds to a respective one of a plurality of buffering periods applied to the buffer, and a compliance of a particular one of the plurality of bitstreams corresponding to a particular one of the scenes with the requirements is determined based on an estimated initial removal delay of a buffering period corresponding to the particular one of the scenes, the estimated initial removal delay denoting a time period until the subsequent decoding of a first one of the pictures in the particular one of the scenes is commenced,
wherein the estimated initial removal delay is calculated based on at least the bit consumption determined in the first pass, and
wherein the compliance with the requirements is further determined based on an estimated final arrival time to removal time delay, the estimated final arrival time to removal time delay denoting a time period between a final arrival time and a removal time of a particular one of the pictures in the video sequence, the final arrival time denoting a time that a final bit of the particular one of the pictures enters the decoded buffer and the removal time denoting a time that the particular one of the pictures is removed from the decoded buffer and instantaneously decoded.

4. The method of claim 3, wherein the particular one of the plurality of bitstreams corresponding to the particular one of the scenes is determined to be compliant with the requirements when an actual initial removal delay of the particular one of the scenes is less than or equal to the estimated initial removal delay of the particular one of the scenes and an actual arrival time to removal time delay of the particular one of the scenes is greater than or equal to the estimated final arrival time to removal time delay of the particular one of the scenes.

* * * * *